United States Patent
Sato et al.

(10) Patent No.: US 9,034,512 B2
(45) Date of Patent: May 19, 2015

(54) GASKET FOR ELECTROCHEMICAL CELL AND ELECTROCHEMICAL CELL

(75) Inventors: Koji Sato, Chiba (JP); Masashi Yamada, Chiba (JP); Shunji Watanabe, Chiba (JP); Kumi Tachibana, Chiba (JP)

(73) Assignee: SEIKO INSTRUMENTS INC., Chiba (JP)

( * ) Notice: Subject to any disclaimer, the term of this patent is extended or adjusted under 35 U.S.C. 154(b) by 314 days.

(21) Appl. No.: 13/046,075

(22) Filed: Mar. 11, 2011

(65) Prior Publication Data

US 2011/0223471 A1    Sep. 15, 2011

(30) Foreign Application Priority Data

Mar. 15, 2010 (JP) .................................. 2010-058445
Jan. 18, 2011 (JP) .................................. 2011-008184

(51) Int. Cl.
*H01M 2/08* (2006.01)
*H01M 2/04* (2006.01)
*H01M 2/02* (2006.01)

(52) U.S. Cl.
CPC .......... *H01M 2/0413* (2013.01); *H01M 2/0222* (2013.01); *H01M 2/0482* (2013.01); *H01M 2/08* (2013.01)

(58) Field of Classification Search
CPC .... H01M 2/08; H01M 2/0413; H01M 2/0222
USPC .................................................. 429/174, 185
See application file for complete search history.

(56) References Cited

U.S. PATENT DOCUMENTS

| | | | | |
|---|---|---|---|---|
| 3,987,929 | A | * | 10/1976 | Mineo .......................... 220/257.1 |
| 5,360,685 | A | * | 11/1994 | Tanaka ............................ 429/185 |
| 6,468,691 | B1 | * | 10/2002 | Malay et al. ................... 429/174 |
| 6,713,215 | B2 | * | 3/2004 | Watanabe et al. ........... 429/231.5 |
| 7,470,482 | B2 | | 12/2008 | Takamura et al. |
| 2007/0015046 | A1 | * | 1/2007 | Kim et al. ........................ 429/53 |

FOREIGN PATENT DOCUMENTS

| | | | |
|---|---|---|---|
| CN | 2216626 Y | | 1/1996 |
| CN | 1645645 A | | 7/2005 |
| CN | 1885590 A | | 12/2006 |
| JP | 2002184368 | * | 6/2002 |
| JP | 2005-123017 A | | 5/2005 |
| JP | 2008-060158 A | | 3/2008 |
| JP | 2008060158 | * | 3/2008 |

* cited by examiner

*Primary Examiner* — Ula C Ruddock
*Assistant Examiner* — Thomas Parsons
(74) *Attorney, Agent, or Firm* — Brinks Gilson & Lione

(57) ABSTRACT

Provided is a gasket for an electrochemical cell, which has good sealing performance and is capable of improving productivity of the gasket, and an electrochemical cell. A gasket (4) for an electrochemical cell, which is made of a resin and has an annular shape including an outer wall and an inner wall, includes a plurality of annular salient portions (4a) formed on an inner side surface of the outer wall.

18 Claims, 5 Drawing Sheets

GASKET FOR ELECTROCHEMICAL CELL AND ELECTROCHEMICAL CELL

RELATED APPLICATIONS

This application claims priority under 35 U.S.C. §119 to Japanese Patent Application Nos. 2010-058445 filed on Mar. 15, 2010 and 2011-008184 filed on Jan. 18, 2011, the entire contents of which are hereby incorporated by reference.

BACKGROUND OF THE INVENTION

1. Field of the Invention

The present invention relates to a gasket for an electrochemical cell, and to an electrochemical cell.

2. Description of the Related Art

Generally, as a power source for backup or the like in a clock function or a semiconductor memory, various electrochemical cells are used so as to realize high energy density and light weight. As a method of mounting the electrochemical cell, for example, reflow soldering is adopted in the case of an electric double layer capacitor.

In the reflow soldering, a printed wiring board on which the electrochemical cell is mounted is heated to a temperature of 200° C. or higher. Therefore, it is important to ensure heat resistance during the reflow soldering so as to improve the sealing performance, for improving reliability of the electrochemical cell.

The electrochemical cell includes a case which serves also as a positive electrode can, a cap which closes an opening part of the case and serves also as a negative electrode can, and an insulating gasket sandwiched between the case and the cap. The electrochemical cell has a structure in which an inner edge of the opening part of the case is caulked with a flange of the cap via the gasket so as to seal electrodes and an electrolyte housed inside.

Conventionally, in order to improve the sealing performance of the gasket, the maximum thickness of an upper part of an outer wall of the gasket is set to a larger value than the minimum thickness of a lower part of the outer wall, and the radius of the upper part of the outer wall of the gasket is set to a larger value than the radius of the lower part of the outer wall (see, for example, Japanese Patent Application Laid-open No. 2005-123017). Because a maximum compression part of the gasket is formed thick, the gasket is less prone to be broken. In addition, because an engaging margin between the negative electrode can and the gasket is increased, the sealing performance is improved. However, because of the increased engaging margin, it is difficult to insert the negative electrode can into the gasket that is inserted into the positive electrode can. Further, a sealing agent applied to the gasket may be removed due to friction between the gasket and the negative electrode can. As a result, it is difficult to improve the sealing performance of the electrochemical cell.

Therefore, there is disclosed a gasket equipped with a guide having an inner radius that is substantially the same as an outer radius of the flange of the negative electrode can which is fit in an annular groove of the gasket, and a housing part extending from a bottom to the outside in the radial direction for housing the sealing agent (see, for example, Japanese Patent Application Laid-open No. 2008-60158). This guide can improve the workability of insertion.

However, although the workability of insertion of the negative electrode can is improved, the engaging margin is small. If it is tried to increase the engaging margin between the gasket and the negative electrode can so as to improve the sealing performance, the sealing agent applied to the gasket is removed by the negative electrode can. On the contrary, in order to improve the sealing performance by the sealing agent, it is necessary to ensure that the sealing agent is not removed. For this purpose, the engaging margin between the gasket and the negative electrode can is required to be decreased. In this way, there is a problem that the large engaging margin cannot be compatible with keeping the sealing agent without removing the same. In addition, there is another problem that even if the workability of insertion of the negative electrode into the gasket can be improved, the sealing agent applied to the gasket may be removed due to a slight change of the insertion state such as an inclination or a displacement of the negative electrode can.

SUMMARY OF THE INVENTION

The present invention has been made to solve the above-mentioned problems, and an object thereof is to provide a gasket for an electrochemical cell having good sealing performance, and to provide an electrochemical cell.

In order to solve the above-mentioned problems, the present invention has adopted the structures described below.

According to a first aspect of the present invention, a gasket for an electrochemical cell, which is made of a resin and has an annular shape including an outer wall and an inner wall, includes a plurality of annular salient portions formed on an inner side surface of the outer wall.

According to the gasket for an electrochemical cell of the first aspect of the invention, compared with the conventional gasket shape, the sealing performance is improved because the plurality of annular salient portions are provided. Both the gasket of the present invention and the conventional, gasket have a guide in a straight shape. The gasket of the present invention has a larger engaging margin between the negative electrode can and the gasket due to the salient portions of the gasket positioned below the guide. Therefore, the sealing performance is improved. In addition, when a sealing agent is applied to an annular groove, the sealing agent is kept in a recess between the salient portions of the gasket. Therefore, the sealing performance is improved.

In addition, fluidity of a gasket material is improved. Generally, when the gasket is molded, an injection hole (gate) for injecting a melted material into a mold is positioned at the inner side in many cases. The gasket in the conventional shape includes a part of the outer wall in which the thickness is decreased and then increased. Therefore, the injection pressure is lowered in this part. As a result, sufficient density of resin cannot be obtained, and a defective product may occur. On the other hand, as for the gasket of the present invention, the injection pressure is applied uniformly. Therefore, a defective product does not occur. As a result, productivity of the gasket is improved. In addition, the gasket sticks to the mold so as be easily exfoliated from a runner.

According to a second aspect of the present invention, in the gasket for an electrochemical cell of the first aspect of the invention, each of the plurality of annular salient portions has a cross-sectional shape that becomes thinner toward a tip end.

According to the second aspect of the gasket for an electrochemical cell, the salient portion becomes thinner toward the tip end, and hence capacity of the recess between the salient portions increases. As a result, a sealing agent housing part can be more secured. Therefore, the sealing performance between a target and the gasket can be improved.

In addition, fluidity of the gasket material is improved. When the gasket is molded, the resin can flow smoothly because the salient portion becomes thinner toward the tip end. Therefore, a loss defect does not occur. As a result, productivity of the gasket is improved.

According to a third aspect of the present invention, in the gasket for an electrochemical cell of the second aspect of the invention, a flat portion is formed between adjacent two of the plurality of annular salient portions.

According to the gasket for an electrochemical cell of the third aspect of the invention, the salient portions are not overlapped to each other because the flat portion is formed between the salient portions. Therefore, the recess between the salient portions does not become shallow. As a result, the sealing agent housing part can be more secured, and insertion workability of the negative electrode can be secured. Therefore, the sealing performance between a target and the gasket can be improved.

According to a fourth aspect of the present invention, in the gasket for an electrochemical cell of the third aspect of the invention, the plurality of annular salient portions are three to six salient portions.

According to the gasket for an electrochemical cell of the fourth aspect of the invention, because three to six salient portions are formed, the sealing agent housing part can be secured, and the sealing agent can be kept in a wide area of the flange of the negative electrode can. Therefore, the sealing performance between a target and the gasket can be improved.

According to a fifth aspect of the present invention, in the gasket for an electrochemical cell of the third aspect of the invention, each of the plurality of annular salient portions has a cross section of substantially a triangular shape.

According to the gasket for an electrochemical cell of the fifth aspect invention, fluidity of the gasket material is improved compared with the conventional gasket shape. As a result, productivity of the gasket is improved. In addition, much of the sealing agent can be retained in the recess between the salient portions. Therefore, the sealing performance between a target and the gasket can be improved.

According to a sixth aspect of the present invention, in the gasket for an electrochemical cell of the fifth aspect of the invention, each of the plurality of annular salient portions has a vertex of an angle of 85 degrees to 95 degrees.

According to the gasket for an electrochemical cell of the six aspect of the invention, if the angle of the vertex of the salient portion is 85 degrees or smaller, fluidity of the resin is deteriorated so that a loss defect easily occurs, and intimate contact among the sealing agent, the gasket, and the negative electrode can becomes insufficient when the positive electrode can is caulked. As a result, the sealing performance is deteriorated. If the angle of the vertex of the salient portion is 95 degrees or larger, the function as a lock for fixing the molded material to the mold becomes insufficient. By setting the angle of the vertex of the salient portion in a range of 85 to 95 degrees, fluidity of the gasket is improved, and the sealing performance between a target and the gasket can be improved.

According to a seventh aspect of the present invention, in the gasket for an electrochemical cell of the third aspect of the invention, each of the plurality of annular salient portions has a height of 0.02 mm or larger and 0.04 mm or smaller.

According to the gasket for an electrochemical cell of the seventh aspect of the invention, if the height of the salient portion is smaller than 0.02 mm, the engaging margin when the negative electrode can is inserted is large, and hence the negative electrode can is not retained sufficiently. Therefore, the sealing performance is deteriorated. If the height of the salient portion is 0.041 mm or larger, the engaging margin is small, and hence the negative electrode can is lifted. Therefore, the sealing performance is deteriorated. By setting the height of the salient portion to be 0.02 mm or larger and 0.04 mm or smaller, the gasket can securely retain the negative electrode can. As a result, the sealing performance between a target and the gasket can be improved.

According to an eighth aspect of the present invention, in the gasket for an electrochemical cell of the third aspect of the invention, the gasket has a guide having a cut edge portion.

According to the gasket for an electrochemical cell of the eighth aspect of the invention, because the gasket has a guide having a cut edge portion, the negative electrode can is guided to an appropriate position by the cut edge portion, and hence the negative electrode can is inserted without damaging to the gasket.

According to a ninth aspect of the present invention, in the gasket for an electrochemical cell of the third aspect of the invention, the gasket is molded by an injection molding method.

According to the gasket for an electrochemical cell of the ninth aspect of the invention, because the gasket is molded by an injection molding method, a lot of gaskets can be molded at one time. Therefore, the productivity can be improved.

According to a tenth aspect of the present invention, in the gasket for an electrochemical cell according to any one of the first to ninth aspects of the invention, the inner wall has an injection hole (gate) for the resin formed thereon.

According to the gasket for an electrochemical cell of the tenth aspect of the invention, because a gate is formed on the inner wall, uniform pressure is applied to the gasket when the caulking is performed. Therefore, the sealing performance can be improved.

According to an eleventh aspect of the present invention, an electrochemical cell includes: a positive electrode can having a cylindrical shape with a bottom, for housing an electrode and an electrolyte; a negative electrode can for closing an opening part of the positive electrode can; and the gasket for an electrochemical cell according to the tenth aspect of the invention having an annular groove to which a sealing agent is applied, so that the positive electrode can and the negative electrode can are caulked.

According to the electrochemical cell of the eleventh aspect of the invention, because the positive electrode can is caulked, intimate contact among the sealing agent applied to the annular groove, the gasket, and the negative electrode can be enhanced. As a result, the sealing performance between the negative electrode can and the gasket can be improved.

According to the present invention, the engaging margin between the gasket and the negative electrode can is increased, and the sealing agent can be retained in the appropriate portion. Therefore, the sealing performance of the gasket is improved. In addition, fluidity of the gasket material during molding is improved, and hence loss defects are reduced. In addition, it is possible to provide an electrochemical cell that is superior in anti-leak property when the gasket is used.

BRIEF DESCRIPTION OF THE DRAWINGS

In the accompanying drawings.

DETAILED DESCRIPTION OF THE PREFERRED EMBODIMENT

Figure 1:
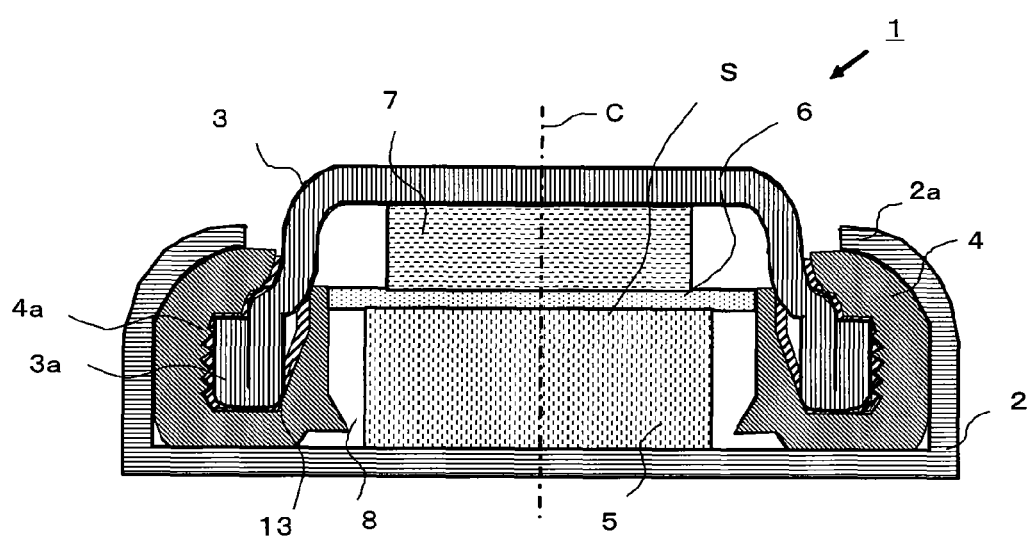
FIG. 1 is a cross sectional view illustrating an electrochemical cell according to an embodiment.

Hereinafter, an embodiment of the present invention is described with reference to FIGS. 1 to 3. FIG. 1 is a cross-sectional side view of an electrochemical cell 1.

In FIG. 1, the electrochemical cell 1 includes a positive electrode can 2 as a case which is formed in a cylindrical shape with a bottom, a negative electrode can 3 as a cap which is formed in, a hat-like shape, a gasket 4 sandwiched between the positive electrode can 2 and the negative electrode can 3, and a seal layer 13 disposed on a surface of the gasket 4. The positive electrode can 2 is caulked with the negative electrode can 3 via the gasket 4 and the seal layer 13 to seal an opening part 2a, so that a sealed housing chamber S is formed between the positive electrode can 2 and the negative electrode can 3. The negative electrode can 3 is preferably made of a material having high strength such as stainless steel so that no plastic deformation occurs in the caulking and sealing process.

In the housing chamber S, there are stacked a positive electrode 5 constituting an electrode pair, a separator 6, and a negative electrode 7 constituting the electrode pair in the stated order from the bottom of the positive electrode can 2. Further, an electrolyte 8 is filled.

The electrochemical cell of the present invention is sealed by caulking. The electrochemical cell specifically means an electric double layer capacitor or a battery.

When the electrochemical cell is used as an electric double layer capacitor, there may be used a product, which is obtained by subjecting an activated carbon powder to press molding or mill rolling together with an appropriate binder for each of the positive electrode 5 and the negative electrode 7. Further, there may be used a product, which is obtained by rendering infusible a fiber such as a phenolic fiber, a rayon-based fiber, an acrylic fiber, or a pitch-based fiber. The infusible fiber is subjected to carbonizing treatment and activating treatment to convert the fiber into activated carbon or an activated carbon fiber. The resultant is formed into a felt, a fiber, a paper sheet, or a sintered body. Further, polyaniline (PAN), polyacene, or the like may also be employed.

An insulating film having a high ion permeability and a high mechanical strength may be used for the separator 6. A glass fiber excellent in heat resistance and mechanical resistance may be used for the separator 6 in consideration of its mounting by reflow soldering. A resin such as polyphenylene sulfide, a polyamide, a polyimide, or polytetrafluoroethylene may be used instead of the above-mentioned materials.

A known liquid electrolyte or gel electrolyte may be used for the electrolyte 8.

In addition, when the electrochemical cell is used as a battery, there may be used, for the positive electrode 5, a product, which is obtained by mixing an appropriate binder and graphite as a conducting aid with a conventionally known active material such as lithium-containing manganese oxide, lithium-containing cobalt oxide, lithium-containing nickel oxide, lithium-containing titanium oxide, molybdenum trioxide, or niobium pentoxide. In addition, when the electrochemical cell is used as a battery, there may be used, for the negative electrode 7, a product, which is obtained by mixing an appropriate binder and graphite as a conducting aid with a conventionally known active material such as carbon, a lithium alloy such as lithium-aluminum, silicon, or silicon oxide.

Figure 2:
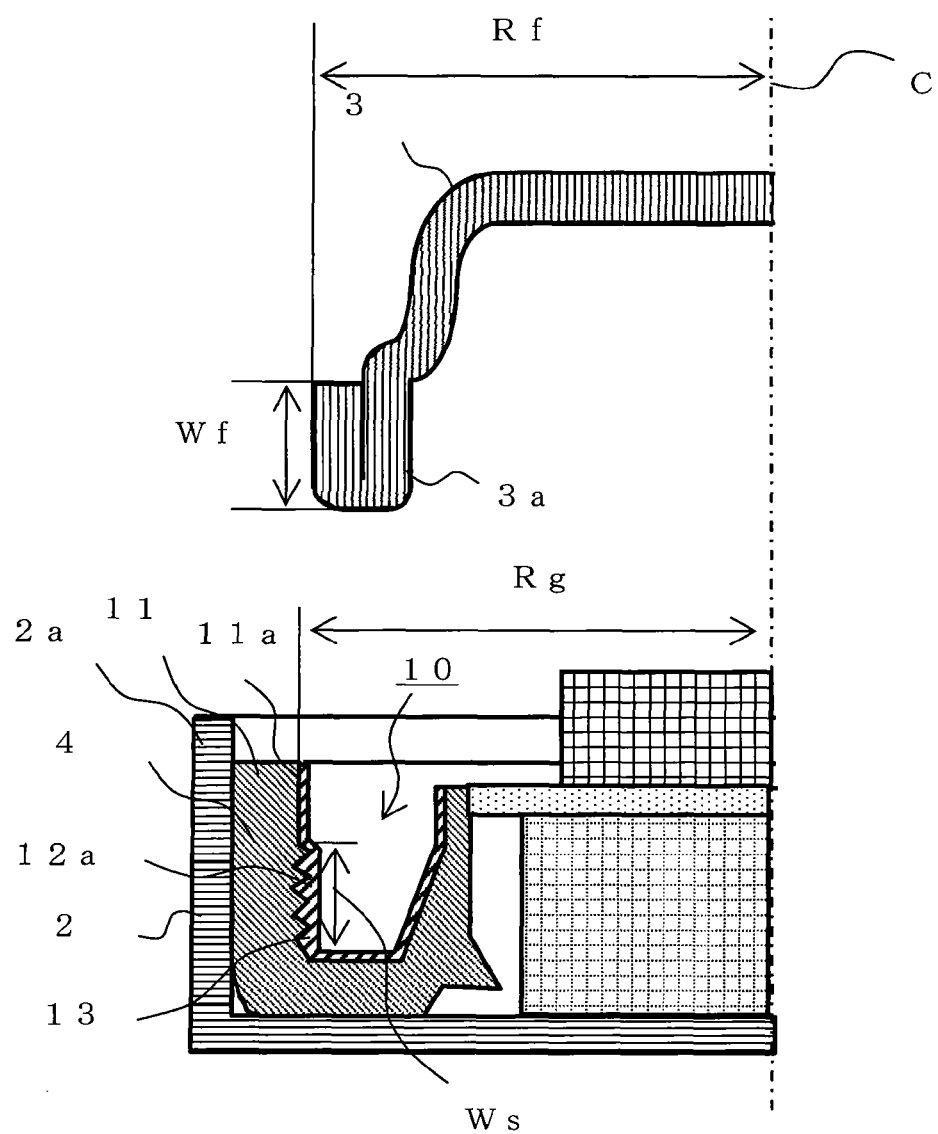
FIG. 2 is a cross sectional view illustrating the electrochemical cell before caulking.

FIG. 2 is a diagram illustrating a state before the opening part 2a of the positive electrode can 2 is caulked with the negative electrode can 3.

In FIG. 2, the negative electrode can 3 has a flange 3a formed by folding along the inner circumference surface of the positive electrode can 2, so as to have a U-shaped cross section. The flange 3a is formed by folding substantially in the direction of a central axis C of the positive electrode can 2 (in the central axis direction) so as to have a predetermined thickness in the central axis direction. In this embodiment, the thickness of the flange 3a in the central axis direction is referred to as a flange thickness Wf, and the outer radius of the flange 3a is referred to as a flange radius Rf.

The shape of the gasket 4 is described with reference to FIGS. 2, 5A, and 5B.

The gasket 4 is molded in an annular shape so as to fit along the inner peripheral surface of the positive electrode can 2. The gasket may be made of a hard engineering plastic having a high heat resistance, such as a polyether ether ketone resin (PEEK), a polyphenylene sulfide resin (PPS), a liquid crystal polymer (LCP), or a polyether nitrile resin (PEN).

The gasket is molded in an annular shape and has an annular groove 10, which has a U-shaped cross section and is formed along the central axis direction as illustrated in FIG. 2. On an outer wall 11 of the annular groove 10, there is formed a guide 11a of the gasket having an inner radius that is substantially the same as the flange radius Rf so as to extend toward the bottom of the gasket. In this embodiment, the inner radius of the guide 11a is referred to as a guide radius Rg.

Figure 5A:
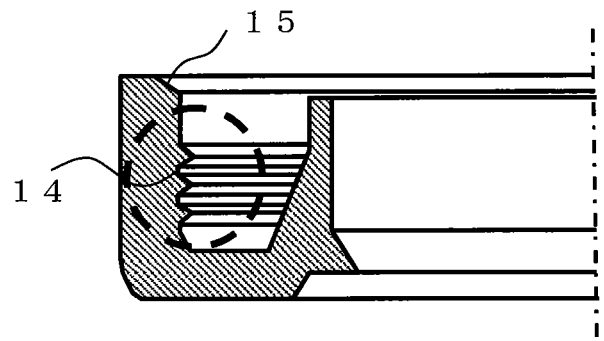
FIGS. 5A and 5B are cross sectional views illustrating an electrochemical cell of an example of the embodiment.
Figure 5B:
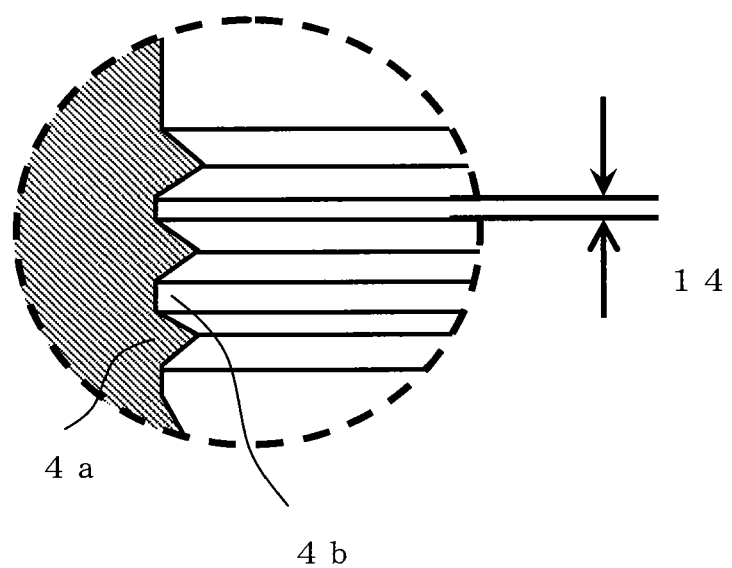

As illustrated in FIG. 5B, salient portions 4a are formed inward in the radial direction, and a recess 4b is formed between the salient portions. A plurality of salient portions 4a and a plurality of recesses 4b constitute a sealing agent housing part 12a. A sealing agent housing part width Ws indicating the width of the sealing agent housing part 12a is substantially the same as the flange thickness Wf. For example, the sealing agent housing part width Ws is formed in a size to cover most of the outer side surface of the flange 3a when the flange 3a is caulked with the positive electrode can 2, as illustrated in FIG. 1. In addition, if the number of the salient portions 4a is less than three, the sealing agent cannot be retained sufficiently and its locking function is insufficient. If the number of the salient portions 4a is seven or larger, the guide 11a cannot be secured sufficiently. Therefore, it is desirable that three to six salient portions 4a are formed.

In addition, as illustrated in FIG. 5B, because a flat portion 14 is formed between the salient portions, the salient portions 4a are not overlapped to each other. If the salient portions 4a are overlapped to each other, the recess 4b between the salient portions becomes shallow. If the recess 4b becomes shallow, the housing part of the sealing agent to be applied becomes small. Therefore, it is desirable that the flat portion 14 be formed in the recess 4b.

In FIG. 2, the seal layer 13 made of the sealing agent is formed on the inner side surface of the annular groove 10. As the sealing agent, it is possible to use an asphalt, an epoxy resin, a polyamide resin, a butyl rubber adhesive, or the like. The seal layer 13 is formed by applying the sealing agent inside the annular groove 10 and drying the same. The sealing agent to be applied to the annular groove 10 is filled in the sealing agent housing part 12a and is dried. Therefore, the seal layer 13 is formed to be thick in the sealing agent housing part 12a because the recesses 4b of the sealing agent housing part 12a are deep. Thus, more sealing agent is housed in the annular groove 10.

When the flange 3a is fit into the annular groove 10, the seal layer 13 covering the guide 11a remains on the surface of the guide 11a without being forcibly removed by the flange 3a, because the guide radius Rg is substantially the same inner radius as the flange radius Rf.

When the flange 3a is caulked with the positive electrode can 2, the seal layer 13 covering the guide 11a enables the sealing agent to have intimate contact with the entire outer side surface of the flange 3a, because the sealing agent housing part width Ws is larger than the flange thickness Wf.

When the flange 3a is caulked with the positive electrode can 2, the seal layer 13 filled in the sealing agent housing part 12a covers the outer side surface of the flange 3a in a wide area by the amount of the sealing agent housed in the sealing agent housing part 12a.

As a result, when the flange 3a is caulked with the positive electrode can 2, more sealing agent can enter between the gasket 4 and the flange 3a in a wide area. Therefore, the sealing performance of the electrochemical cell 1 can be improved.

As a method of manufacturing the gasket 4, it is possible to adopt an injection molding method or a thermal compression method. Generally, the injection molding method is used. The injection molding method is a type of processing method for plastic or the like. In the method, a heated and melted material is injected by pressure and is press-filled in a mold that is processed in a desired shape. After cooling and curing the material, the molded material is taken out from the mold, to thereby obtain the gasket. When the injection molding method is used, the salient portions of the gasket can also be utilized as a lock for fixing the molded material to the mold. In the present invention, the gasket is manufactured using the injection molding method. In addition, it is not desirable that a gate as an injection hole for a resin be positioned at a part on the outer wall of the gasket which contacts with the positive electrode can or the negative electrode can. Otherwise, uniform pressure cannot be applied after the caulking, and hence the sealing performance is deteriorated. Therefore, it is desirable to provide the gate on the inner wall.

Figure 3A:
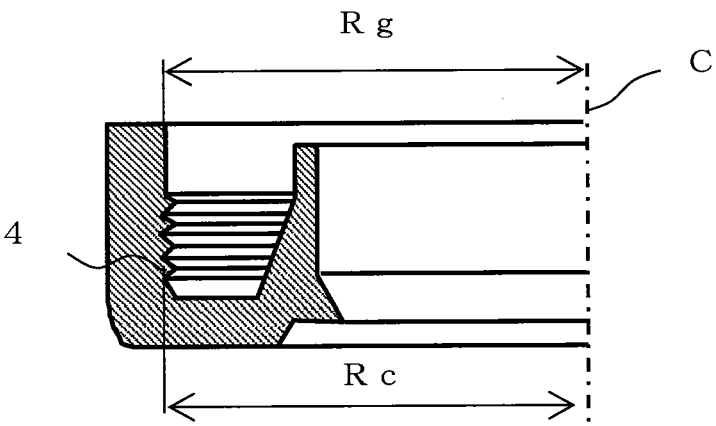
FIGS. 3A to 3C are diagrams for comparing a gasket of the present invention with conventional examples.
Figure 3B:
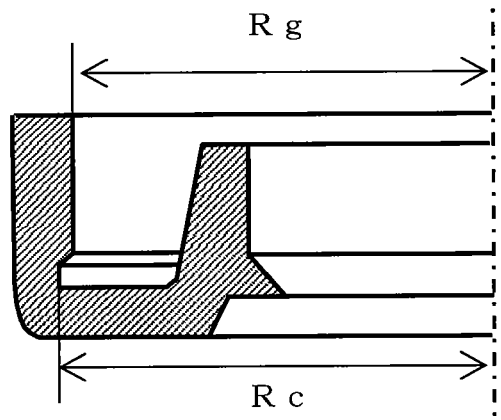
Figure 3C:
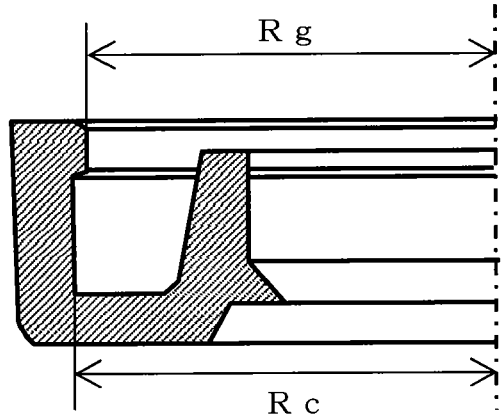

Next, the effects of the present invention are described with reference to Examples and Comparative Examples. FIGS. 3A to 3C, 4A to 4C, and 5A and 5B are diagrams illustrating cross-sectional shapes of the gasket. FIG. 3A illustrates a gasket of Example 1 as an example of the gasket according to the present invention. FIG. 3B illustrates a gasket of Comparative Example 1 as an example of a conventional gasket. FIG. 3C illustrates a gasket of Comparative Example 2.

Figures 4A, 4B, 4C:
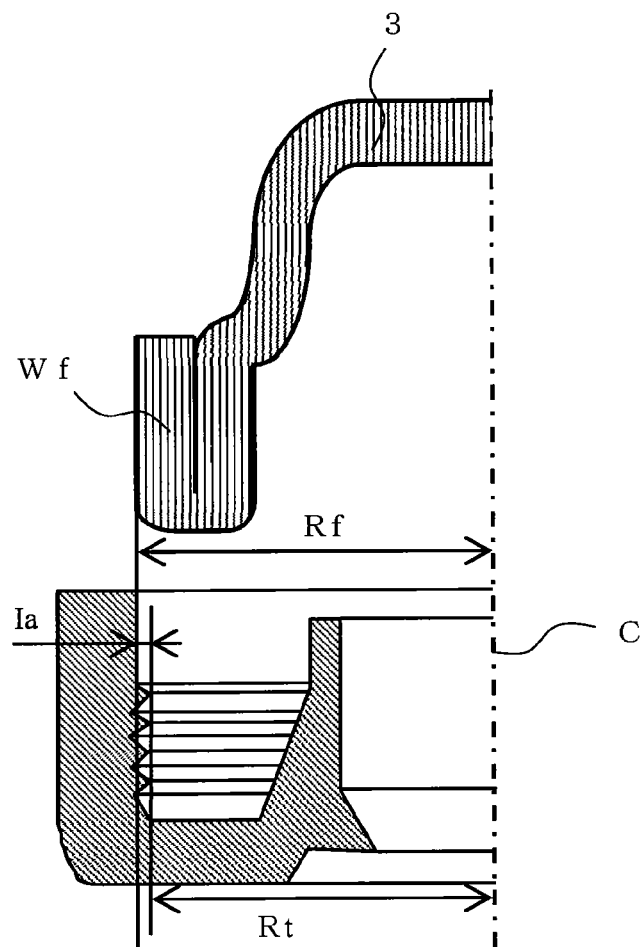
FIGS. 4A to 4C are diagrams for comparing an engaging margin between the gasket and a negative electrode can of the present invention with conventional examples.

FIGS. 4A to 4C are diagrams illustrating engaging margins between the gasket and the negative electrode can of Example and Comparative Examples. FIG. 4A illustrates a gasket of Example 1 as an example of the gasket according to the present invention. FIG. 4B illustrates a gasket of Comparative Example 1 as an example of a conventional gasket. FIG. 4C illustrates a gasket of Comparative Example 2. Each of the gaskets illustrated in FIGS. 4B and 4C does not have the salient portions on the inner portion of the outer wall 11 corresponding to the flange thickness Wf of the negative electrode can. The gasket illustrated in FIG. 4B has the straight portion extending from the guide toward the bottom, and the sealing agent housing part at the bottom extending outward in the radial direction. The gasket illustrated in FIG. 4C has the guide protruding inward in the radial direction, and the straight portion extending from the lower end of the guide toward the bottom.

FIGS. 5A and 5B illustrate a gasket having the shape used in Example 2. FIG. 5A is a cross sectional view, and FIG. 5B is an enlarged view of the salient portions 4a, the recesses 4b, and the flat portions 14. The flat portion 14 is disposed between the salient portions. The recess 4b is constituted of the slopes of the salient portions 4a and the flat portion 14.

EXAMPLE 1

First, the positive electrode can 2 made of stainless steel and the negative electrode can 3 made of stainless steel were obtained. Subsequently, a positive electrode mixture was prepared by mixing ground molybdenum trioxide, graphite, and polyacrylic acid at a weight ratio "molybdenum trioxide:graphite:polyacrylic acid" of 53:45:2. 5 mg of the positive electrode mixture were pressurized at 2 ton/cm$^2$ to form a pellet having a diameter of 2.4 mm, to thereby obtain a positive electrode pellet as a positive electrode 5. Then, the positive electrode 5 was bonded to the positive electrode can 2 using an electrode collector formed of a conductive resin adhesive in which carbon served as a conductive filler, to thereby form a positive electrode unit. After that, the positive electrode unit was dried under reduced pressure at 250° C. for 8 hours.

In addition, a negative electrode mixture was prepared by mixing ground silicon oxide, graphite, and polyacrylic acid at a weight ratio "silicon oxide:graphite:polyacrylic acid" of 45:40:15. 1.1 mg of the negative electrode mixture were pressurized at 2 ton/cm$^2$ to form a pellet having a diameter of 2.1 mm, to thereby obtain a negative electrode pellet. Subsequently, the negative electrode pellet was bonded to the negative electrode can 3 using an electrode collector formed of a conductive resin adhesive in which carbon served as a conductive filler, to thereby form a negative electrode unit. After that, the negative electrode unit was dried under reduced pressure at 250° C. for 8 hours. Further, a lithium-negative electrode pellet laminated electrode as a negative electrode 7 was formed by crimping a punched out lithium foil having a diameter of 2 mm and a thickness of 0.2 mm onto the negative electrode pellet.

The separator 6 was obtained by drying a nonwoven fabric being made of a glass fiber and having a thickness of 0.2 mm, and punching out a disk having a diameter of 3 mm from the nonwoven fabric.

The electrolyte 8 was obtained by dissolving lithium borofluoride ($LiBF_4$) at a concentration of 1 mol/liter in a mixed solvent prepared by mixing ethylene carbonate (EC) and γ-butyrolactone (γBL) at a volume ratio "EC:γBL" of 1:1.

Next, the injection molding method was performed using a polyether ether ketone resin, so as to obtain the gasket 4 having an outer diameter of 4.6 mm, a radial direction thickness of 1 mm, and a height of the salient portion 4a of 0.03 mm. The gasket 4 of Example 1 illustrated in FIG. 3A was formed so that the guide radius Rg has the same value as the flange radius Rf. In addition, a maximum inner radius Rc of the sealing agent housing part was also set to the same value as the guide radius Rg and the flange radius Rf. A minimum inner radius Rt of the part corresponding to the flange thickness Wf after the negative electrode can 3 is inserted was formed to be smaller than the flange radius Rf by 0.03 mm. Therefore, the engaging margin between the negative electrode can and the gasket was 0.03 mm.

Next, the sealing agent was obtained by dissolving a butyl rubber-based adhesive (butyl rubber: 30 wt %, toluene: 70 wt %) and blown asphalt in toluene. The sealing agent was applied to an inner edge of the positive electrode can 2 and dried by heating in a dry room at 120° C. In addition, the gasket 4 was fit into an inner edge of the positive electrode can 2 to which the sealing agent had been applied. Then, the sealing agent was applied to an inside of the annular groove 10 of the gasket 4 and dried by heating in a dry room at 120° C., to thereby form the seal layer 13.

Then, the flange 3a of the negative electrode can 3 was inserted into the annular groove 10 of the gasket 4, the electrolyte 8 was put into the housing chamber S, and the negative electrode can 3 was caulked. Thus, a secondary battery as the electrochemical cell 1 of Example 1, having an outer diameter of 4.8 mm and a thickness of 1.4 mm, was formed.

Based on Example 1 described above, 500 secondary batteries were manufactured, and it was checked whether or not a crack occurred in the gasket 4 when the flange 3a was inserted into the annular groove 10 of the gasket 4. In addition, each of the secondary batteries was conveyed to pass through a reflow furnace at a preheating temperature of 200° C. and a reach temperature of 260° C., for 3 minutes of the passing time. Then, it was checked whether or not there was a leak of liquid in each of the secondary batteries. Further, a voltage of 3.3 V was applied between the positive electrode and the negative electrode of each of the secondary batteries, which was kept in an atmosphere of 60° C. and 90% for 20 days, and the capacity retention ratio was measured. The capacity of each of the secondary batteries was measured as follows. A voltage of 3.3 V was applied between the positive electrode and the negative electrode so as to charge the secondary battery at a constant current of 50 µA for 24 hours. After that, discharging was performed at a constant current of 5 µA, and the time until the voltage between the positive electrode and the negative electrode became 1.4 V was measured so as to calculate the capacity.

EXAMPLE 2

First, the positive electrode unit, the negative electrode unit, the separator 6, and the electrolyte 8 were obtained by the same method as Example 1.

Next, the gasket having the shape illustrated in FIG. 5A was molded by the injection molding method using a polyether ether ketone resin. Unlike Example 1, the flat portion 14 is formed between the salient portions. In addition, the guide of the gasket has a cut edge portion 15. In the same manner as Example 1, there was obtained the gasket having an outer diameter of 4.6 mm, a thickness in the radial direction of 1 mm, and a height of the salient portion 4a of 0.03 mm. The engaging margin between the negative electrode can and the gasket was 0.03 mm similarly to Example 1. The seal layer 13 was formed in the same method as Example 1, and the flange 3a of the negative electrode can 3 was inserted into the annular groove 10 of the gasket. Then, the electrolyte 8 of the same amount as Example 1 was put into the housing chamber S, and the negative electrode can 3 was caulked. Thus, a secondary battery as the electrochemical cell 1 described in Example 2 was formed.

Based on Example 2 described above, 500 secondary batteries were manufactured, and similar to Example 1, tests were performed about the crack in the gasket upon insertion, the leak of liquid, and the capacity retention ratio.

COMPARATIVE EXAMPLE 1

First, the positive electrode unit, the negative electrode unit, the separator 6, and the electrolyte 8 were obtained by the same method as Example 1.

Next, by the injection molding method using a polyether ether ketone resin, in the same manner as Example 1, there was obtained the gasket having an outer diameter of 4.6 mm and a thickness in the radial direction of 1 mm. The gasket 4 of Comparative Example 1 illustrated in FIG. 3B is formed so that the guide radius Rg is smaller than the flange radius Rf by 0.01 mm, and that the maximum inner radius Rc of the gasket sealing agent housing part is larger than the guide radius Rg by 0.03 mm and is larger than the flange radius Rf by 0.02 mm. The minimum inner radius Rt of the part corresponding to the flange thickness Wf after the negative electrode can 3 is inserted is the same as the guide radius Rg, and therefore is formed smaller than the flange radius Rf by 0.01 mm. Therefore, the engaging margin between the negative electrode can and the gasket is 0.01 mm. Then, the seal layer 13 was formed by the same method as Example 1, and the flange 3a of the negative electrode can 3 was inserted into the annular groove 10 of the gasket 4. Then, the electrolyte 8 of the same amount as Example 1 was put into the housing chamber S, and the negative electrode can 3 was caulked. Thus, a secondary battery as the electrochemical cell 1 described in Comparative Example 1 was formed.

Based on Comparative Example 1 described above, 500 secondary batteries were manufactured, and similar to Example 1, tests were performed about the crack in the gasket upon insertion, the leak of liquid, and the capacity retention ratio.

COMPARATIVE EXAMPLE 2

First, the positive electrode unit, the negative electrode unit, the separator 6, and the electrolyte 8 were obtained by the same method as Example 1.

Next, by the injection molding method using a polyether ether ketone resin, in the same manner as Example 1, there was obtained the gasket having an outer diameter of 4.6 mm and a thickness in the radial direction of 1 mm. As illustrated in FIG. 3C, the gasket 4 of Comparative Example 2 is formed so that the guide radius Rg is smaller than the flange radius Rf by 0.07 mm, and that the maximum inner radius Rc of the gasket sealing agent housing part is larger than the guide radius Rg by 0.03 mm and is smaller than the flange radius Rf by 0.04 mm. The minimum inner radius Rt of the part corresponding to the flange thickness Wf after the negative electrode can 3 is inserted is the same as the maximum inner radius Rc of the gasket sealing agent housing part, and therefore is formed smaller than the flange radius Rf by 0.04 mm. Therefore, the engaging margin between the negative electrode can and the gasket is 0.04 mm. Then, the seal layer 13 was formed by the same method as Example 1, and the flange 3a of the negative electrode can 3 was inserted into the annular groove 10 of the gasket 4. Then, the electrolyte 8 of the same amount as Example 1 was put into the housing chamber S, and the negative electrode can 3 was caulked. Thus, a secondary battery as the electrochemical cell 1 described in Comparative Example 2 was formed.

Based on Comparative Example 2 described above, 500 secondary batteries were manufactured, and similar to Example 1, tests were performed about the crack in the gasket 4 upon insertion, the leak of liquid, and the capacity retention ratio.

TABLE 1

|  | Ratio of defective gaskets |
| --- | --- |
| Example 1 | 0.64% |
| Example 2 | 0.58% |

TABLE 1-continued

| | Ratio of defective gaskets |
|---|---|
| (Comparative Example 1) | 11.25% |
| (Comparative Example 2) | 3.02% |

TABLE 2

| | Ratio of cracks (%) | Ratio of leaks of liquid (%) | Capacity retention ratio (%) |
|---|---|---|---|
| Example 1 | 0 | 0 | 85 |
| Example 2 | 0 | 0 | 86 |
| (Comparative Example 1) | 0 | 0 | 70 |
| (Comparative Example 2) | 2 | 6 | 35 |

TABLE 3

| | Engaging margin between gasket and negative electrode can (mm) |
|---|---|
| Example 1 | 0.03 |
| Example 2 | 0.03 |
| (Comparative Example 1) | 0.01 |
| (Comparative Example 2) | 0.04 |

TABLE 4

| | Comparison of capacity of sealing agent housing part |
|---|---|
| Example 1 | 2.3 |
| Example 2 | 2.5 |
| (Comparative Example 1) | 1 |

Table 1 shows a ratio of defective gaskets when the gaskets 4 were molded. The ratio of defective gaskets is obtained by checking whether or not there is a loss defect or a density defect of a resin in the molded gasket using a magnifying glass. Table 1 shows that the gasket of Example 1 illustrated in FIG. 3A and the gasket of Example 2 illustrated in FIG. 5A are lower in ratio of defective gaskets than the gasket of Comparative Example 1 illustrated in FIG. 3B and the gasket of Comparative Example 2 illustrated in FIG. 3C. Therefore, productivity is improved by adopting the gasket shape of Example 1 or Example 2.

Table 2 shows the ratio of cracks in gaskets in the assembling process, the ratio of leaks of liquid, and the capacity retention ratio. The ratio of cracks in gaskets was obtained by checking whether or not there is a crack in the gasket using a magnifying glass after the negative electrode can is inserted into the gasket which is inserted into the positive electrode can. The ratio of leaks of liquid was obtained by checking whether or not there is a leak of liquid using a magnifying glass after the secondary battery is conveyed to pass through the reflow furnace. The capacity retention ratio was obtained as follows. A voltage of 3.3 V was applied between the positive electrode and the negative electrode of the secondary battery, which was kept in an atmosphere of 60° C. and 90% for 20 days, and then the capacity retention ratio was measured. The capacity of the secondary battery was measured as follows. A voltage of 3.3 V was applied between the positive electrode and the negative electrode so as to charge the secondary battery at a constant current of 50 μA for 24 hours. After that, discharging was performed at a constant current of 5 μA, and the time until the voltage between the positive electrode and the negative electrode became 1.4 V was measured so as to calculate the capacity. Table 2 shows that cracks occurred in 2% of gaskets of Comparative Example 2. However, no crack occurred in the gaskets of Example 1, Example 2, and Comparative Example 1. In addition, Table 3 shows that the gaskets of Example 1, Example 2, and Comparative Example 2 have larger engaging margins than the gasket of Comparative Example 1. In other words, the gaskets of Example 1 and Example 2 do not cause cracks, and have the larger engaging margin of gasket so that the sealing performance is improved.

In addition, although leaks of liquid were found in 6% of the gaskets of Comparative Example 2, no leak of liquid was found in Example 1, Example 2, and Comparative Example 1. In other words, when the positive electrode can is caulked, the sealing agent housed in the sealing agent housing part 12 covers a wide area of the flange 3a of the negative electrode can, and hence the sealing performance is improved.

In addition, the capacity retention ratio of Comparative Example 1 is 70%, and the capacity retention ratio of Comparative Example 2 is 35%. On the other hand, the capacity retention ratio of Example 1 is 85%, and the capacity retention ratio of Example 2 is 86%, which are both high values. As a result, the gaskets of Example 1 and Example 2 maintain the electrical characteristics by the improvement of the sealing performance of the secondary battery.

Table 3 shows the engaging margin between the gasket and the negative electrode can. In addition, FIGS. 4A to 4C show the engaging margins Ia, Ib, Ic between the gasket and the negative electrode can. Here, the engaging margin of the negative electrode can means a difference between the flange radius Rf of the negative electrode can and the minimum inner radius Rt of the part corresponding to the flange thickness Wf as illustrated in FIGS. 4A to 4C. It is understood from Table 3 that the engaging margins in Example 1, Example 2, and Comparative Example 2 are larger than that in Comparative Example 1. However, as shown in Table 2, a crack occurred in the gasket of Comparative Example 2 when the negative electrode can was inserted. In other words, only the gaskets of Example 1 and Example 2 can increase the engaging margin without causing a crack when the gasket is inserted. Thus, the sealing performance is improved.

Table 4 shows a comparison of the amount of the applied gasket sealing agent. The amount of the applied gasket sealing agent indicates a weight ratio of the sealing agent applied to the gasket. In Table 4, the amount of the applied gasket sealing agent in Example 1 is 2.3 times larger than that in Comparative Example 1, and the amount of the applied gasket sealing agent in Example 2 is 2.5 times larger than the same. In other words, the gaskets of Example 1 and Example 2 have more sealing agent adhered to the flange of the negative electrode can, and hence the sealing performance is improved.

In addition, the secondary batteries described in Example 1 and Example 2 are taken apart after the test, and the guides 11a of the gaskets were observed. Compared with Example 2, some guides 11a of Example 1 had a small flaw. In Example 2, because the guide 11a of the gasket has a cut edge portion, the negative electrode can is guided to an appropriate position so that the negative electrode can is inserted without damaging to the gasket. The flaw in the gasket of Example 1 has no problem practically, but it is more effective that the guide 11a of the gasket has a cut edge portion for keeping the sealing performance for a longer period.

EXAMPLE 3

First, the positive electrode unit, the negative electrode unit, the separator 6, and the electrolyte 8 were obtained by the same method as Example 1.

Next, the gasket having the shape illustrated in FIG. 4A was formed by the injection molding method using a polyether ether ketone resin. In the same manner as Example 1, there was obtained the gasket having an outer diameter of 4.6 mm, a thickness in the radial direction of 1 mm, and a height of the salient portion 4a of 0.02 mm. The engaging margin between the negative electrode can and the gasket is 0.02 mm. The seal layer 13 was formed in the same method as Example 1, and the flange 3a of the negative electrode can 3 was inserted into the annular groove 10 of the gasket 4. Then, the electrolyte 8 of the same amount as Example 1 was put into the housing chamber S, and the negative electrode can 3 was caulked. Thus, a secondary battery as the electrochemical cell 1 described in Example 3 was formed.

Based on Example 3 described above, 100 secondary batteries were manufactured, and similar to Example 1, tests were performed about the crack in the gasket upon insertion, the leak of liquid, and the capacity retention ratio.

EXAMPLE 4

Similarly to Example 3, gaskets were manufactured in which only the height of the salient portion 4a was changed to be 0.04 mm. The engaging margin between the negative electrode can and the gasket is 0.04 mm. As to other members than the gasket, the same members as Example 3 were used so as to manufacture the secondary battery. In addition, the tests were performed in the same manner as in Example 3.

EXAMPLE 5

Similarly to Example 3, gaskets were manufactured in which only the height of the salient portion 4a was changed to be 0.01 mm. The engaging margin between the negative electrode can and the gasket is 0.01 mm. As to other members than the gasket, the same members as Example 3 were used so as to manufacture the secondary battery. In addition, the tests were performed in the same manner as in Example 3.

EXAMPLE 6

Similarly to Example 3, gaskets were manufactured in which only the height of the salient portion 4a was changed to be 0.05 mm. The engaging margin between the negative electrode can and the gasket is 0.05 mm. As to other members than the gasket, the same members as Example 3 were used so as to manufacture the secondary battery. In addition, the tests were performed in the same manner as in Example 3.

TABLE 5

|  | Ratio of cracks (%) | Ratio of leaks of liquid (%) | Capacity retention ratio (%) | Height of salient portion (mm) |
|---|---|---|---|---|
| Example 3 | 0 | 0 | 85 | 0.02 |
| Example 4 | 0 | 0 | 87 | 0.04 |
| Example 5 | 0 | 0 | 80 | 0.01 |
| Example 6 | 0 | 0 | 88 | 0.05 |

Table 5 shows the ratio of cracks in gaskets in the assembling process, the ratio of leaks of liquid, and the capacity retention ratio. As shown in Table 5, the ratio of cracks and the ratio of leaks of liquid were both 0% in each of Examples 3 to 6. The capacity retention ratio was 85% in Example 3, 87% in Example 4, and 88% in Example 6, which were high capacity retention ratios. However, the capacity retention ratio in Example 5 was 80%, which has no problem practically but is a little lower than those in other Examples. Therefore, it is preferable to use a gasket that has the salient portion 4a having a height of 0.02 mm or larger for increasing the sealing performance securely so as to ensure high capacity retention ratio.

In addition, no crack occurred in the gasket of Example 6, but the engaging margin with the negative electrode can was small, and there were cases where the negative electrode was lifted. If the negative electrode can is pressed sufficiently in the sealing process, there is no problem. If the negative electrode cannot be pressed sufficiently in the sealing process, it is preferable to use a gasket that has the salient portion 4a having a height of 0.04 mm or smaller.

Next, effects of this embodiment having the above-mentioned structure are described below.

(1) As illustrated in FIG. 1, the gasket 4 includes a guide 11a that is formed on the outer wall side of the annular groove 10 and has an inner radius that is substantially the same as the outer radius of the flange 3a of the negative electrode can 3, the guide 11a extending to the start point of the salient portions, and the sealing agent housing part 12a constituted of a plurality of salient portions 4a and recesses 4b of the gasket for housing the sealing agent. Therefore, when the opening part 2a of the positive electrode can 2 is caulked so that the outer wall 11 of the annular groove 10 have intimate contact with the flange 3a, the sealing agent housed in the sealing agent housing part 12a can be retained effectively in a large amount and wide area between the gasket 4 and the flange 3a. Therefore, the sealing performance of the electrochemical cell 1 can be improved. Thus, the leak of liquid of the electrochemical cell 1 can be reduced so that long-term preservation property can be improved.

(2) When the gasket 4 is molded by the injection molding method, the salient portions 4a of the gasket in the sealing agent housing part 12a can be utilized as a lock. Therefore, it is not necessary to form an additional lock portion, thereby productivity of the gasket 4 can be improved.

What is claimed is:
1. A gasket for an electrochemical cell, which is made of a resin and has an annular shape including an outer wall and an inner wall, comprising a plurality of annular salient portions extending radially inward that are formed on an inner side surface of the outer wall, wherein the plurality of annular salient portions are positioned adjacent to a flange of a negative electrode can,
   wherein the inner side surface of the outer wall comprises a guiding portion, and further comprises a sealing agent housing part disposed below the guiding portion,
   wherein the sealing agent housing part comprises the plurality of annular salient portions in addition to recesses in-between the plurality of annular salient portions,
   wherein the cross-section of the guiding portion is straight, and
   wherein each of the plurality of annular salient portions are disposed radially inward of the guiding portion when the electrochemical cell is in an unassembled state.
2. A gasket for an electrochemical cell according to claim 1, wherein each of the plurality of annular salient portions has a cross-sectional shape that becomes thinner toward a tip end.

3. A gasket for an electrochemical cell according to claim 2, further comprising a flat portion formed between adjacent two of the plurality of annular salient portions.

4. A gasket for an electrochemical cell according to claim 3, wherein the plurality of annular salient portions comprise three to six salient portions.

5. A gasket for an electrochemical cell according to claim 3, wherein each of the plurality of annular salient portions has a cross section of substantially a triangular shape.

6. A gasket for an electrochemical cell according to claim 5, wherein each of the plurality of annular salient portions has a vertex of an angle of 85 degrees to 95 degrees.

7. A gasket for an electrochemical cell according to claim 3, wherein each of the plurality of annular salient portions has a height of 0.02 mm or larger and 0.04 mm or smaller.

8. A gasket for an electrochemical cell according to claim 3, wherein the guiding portion comprises a cut edge portion.

9. A gasket for an electrochemical cell according to claim 3, wherein the gasket is molded by an injection molding method.

10. A gasket for an electrochemical cell according to claim 1, wherein the inner wall has an injection hole (gate) for the resin formed thereon.

11. An electrochemical cell, comprising:
a positive electrode can having a cylindrical shape with a bottom, for housing an electrode and an electrolyte;
a negative electrode can for closing an opening part of the positive electrode can; and
the gasket for an electrochemical cell according to claim 10 having an annular groove to which a sealing agent is applied, so that the positive electrode can and the negative electrode can are caulked.

12. A gasket for an electrochemical cell according to claim 1, wherein the gasket is made of a hard engineering plastic.

13. A gasket for an electrochemical cell according to claim 12, wherein the hard engineering plastic has a high heat resistance.

14. A gasket for an electrochemical cell according to claim 12, wherein the hard engineering plastic is selected from the group comprising polyether ether ketone resin, a polyphenylene sulfide resin, a liquid crystal polymer, or a polyether nitrile resin.

15. A gasket for an electrochemical cell according to claim 1, wherein a seal layer having a thickness that varies is formed to be thicker in the recesses of the gasket.

16. A gasket for an electrochemical cell according to claim 1, wherein the sealing agent housing part comprises a width that is substantially the same as a thickness of the flange of the negative electrode can.

17. A gasket for an electrochemical cell, which is made of a resin and has an annular shape including an outer wall and an inner wall, comprising a plurality of annular salient portions extending radially inward that are formed on an inner side surface of the outer wall,
wherein the outer wall has upper and lower regions, and wherein the plurality of annular salient portions are positioned only along the lower region of the outer wall,
wherein the inner side surface of the outer wall comprises a guiding portion, and further comprises a sealing agent housing part disposed below the guiding portion,
wherein the sealing agent housing part comprises the plurality of annular salient portions in addition to recesses in-between the plurality of annular salient portions,
wherein the cross-section of the guiding portion is straight, and
wherein each of the plurality of annular salient portions are dispersed inward of the guiding portion when the electrochemical cell is in an unassembled state.

18. A gasket for an electrochemical cell according to claim 17, wherein the sealing agent housing part comprises a width that is substantially the same as a thickness of a flange of a negative electrode can.

* * * * *